(12) United States Patent
Fung

(10) Patent No.: US 8,930,175 B1
(45) Date of Patent: Jan. 6, 2015

(54) METHOD AND APPARATUS FOR PERFORMING TIMING ANALYSIS THAT ACCOUNTS FOR RISE/FALL SKEW

(75) Inventor: Ryan Fung, Mississauga (CA)

(73) Assignee: Altera Corporation, San Jose, CA (US)

(*) Notice: Subject to any disclaimer, the term of this patent is extended or adjusted under 35 U.S.C. 154(b) by 429 days.

(21) Appl. No.: 13/368,587

(22) Filed: Feb. 8, 2012

(51) Int. Cl.
*G06F 17/50* (2006.01)

(52) U.S. Cl.
CPC .......... *G06F 17/5031* (2013.01); *G06F 17/509* (2013.01)
USPC ............................................. 703/19; 716/108

(58) Field of Classification Search
CPC G06F 17/5059; G06F 17/509; G06F 17/5031
USPC ...................... 703/19; 716/108, 112, 113, 134
See application file for complete search history.

(56) References Cited

U.S. PATENT DOCUMENTS

| 6,877,143 | B1* | 4/2005 | Palermo et al. ............... 716/108 |
| 7,119,570 | B1* | 10/2006 | Chirania et al. ........... 324/750.3 |
| 8,386,866 | B2* | 2/2013 | Chung .......................... 714/731 |
| 2008/0295053 | A1* | 11/2008 | Dasdan et al. ..................... 716/6 |
| 2012/0036171 | A1* | 2/2012 | Rindner ........................ 708/207 |
| 2012/0047477 | A1* | 2/2012 | Kalafala et al. ............... 716/108 |

OTHER PUBLICATIONS

Sapatnekar "Timing", 2004 Kluver Academic Publishers. 29 pages.*

* cited by examiner

*Primary Examiner* — Eunhee Kim
(74) *Attorney, Agent, or Firm* — L. Cho

(57) ABSTRACT

A method for designing a system on a target device includes performing timing analysis at an intermediate node on a data path from a source to a destination to determine whether rise and fall skew of components on the data path could result in data not being sampled at the destination.

25 Claims, 13 Drawing Sheets

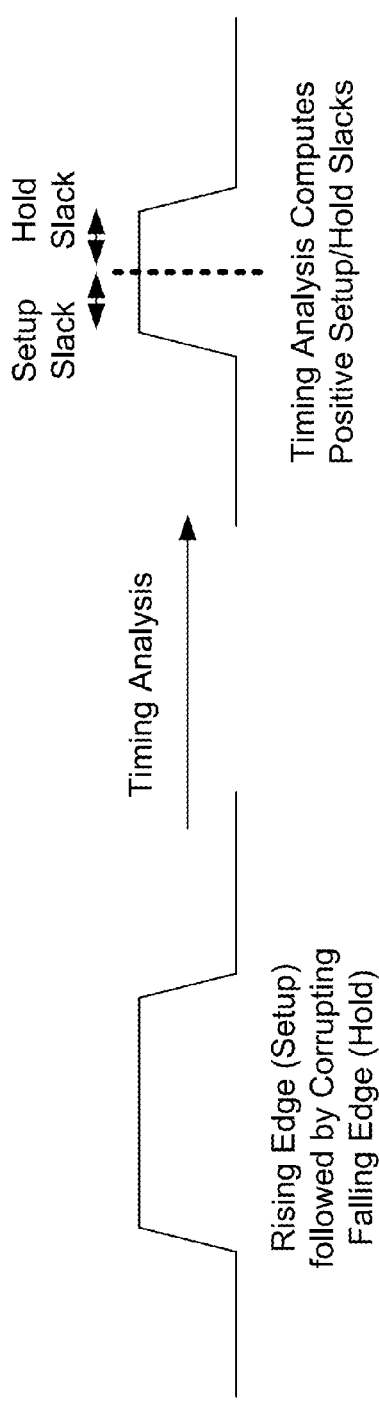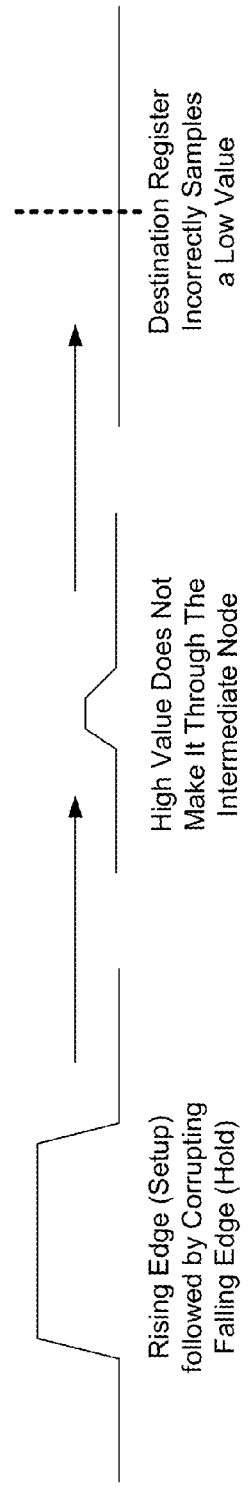

US 8,930,175 B1

METHOD AND APPARATUS FOR PERFORMING TIMING ANALYSIS THAT ACCOUNTS FOR RISE/FALL SKEW

FIELD

Embodiments of the present invention relate to tools for designing systems on target devices. More specifically, embodiments of the present invention relate to a method and apparatus for performing timing analysis that accounts for rise/fall skew.

BACKGROUND

Target devices such as field programmable gate arrays (FPGAs), structured application specific integrated circuits (ASICs), and ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow are synthesis, placement, and routing of the system on the target device.

After a system has been synthesized, placed, and routed on a target device, it is important that the system achieves timing closure where all timing constraints in the system are met in order to ensure proper functionality. A timing analysis is performed by the EDA tool to determine whether timing closure is achieved.

Rise/fall skew (rise/fall delay) is a material effect present in modern target devices. Rise/fall skew occurs when there is a difference in the rise time and fall time required for pulling up and pulling down a signal at a node. Some target devices, such as FPGAs, rely more heavily on NMOS pass gates to implement programmable switches. Due to the asymmetric rise/fall characteristics of NMOS pass gates, rise/fall skew is found to be more prevalent in data paths in FPGAs.

In the past, rise/fall skew has generally been small relative to path delay. As a result, traditional timing analysis performed by EDA tools did not adequately analyze the impact of rise/fall skew at the intermediate nodes along a data path. However, with the current trend of systems experiencing greater rise/fall skew, such traditional timing analysis may erroneously report that a system achieves timing closure when, in fact, it will fail to function in silicon.

SUMMARY

A method and apparatus for performing timing analysis that accounts for rise/fall skew is disclosed. According to an embodiment of the present invention timing analysis is performed at an intermediate node on a data path from a source to a destination to determine whether rise and fall skew of components on the data path could result in data not being sampled at the destination. The timing analysis may involve comparing a maximum arrival time of data on the data path at the intermediate node with a minimum arrival time of the data on the data path at the intermediate node. The timing analysis described allows checking of intermediate nodes for corruption of data that may prevent the propagation of valid signals to destinations that would be missed by traditional timing analysis.

BRIEF DESCRIPTION OF THE DRAWINGS

The features and advantages of embodiments of the present invention are illustrated by way of example and are not intended to limit the scope of the embodiments of the present invention to the particular embodiments shown.

FIG. 3A illustrates a traditional analysis of rise/fall skew squishing a pulse.

FIG. 3B illustrates an example of an actual result of a squish pulsed due to rise/fall skew.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

Figure 1:
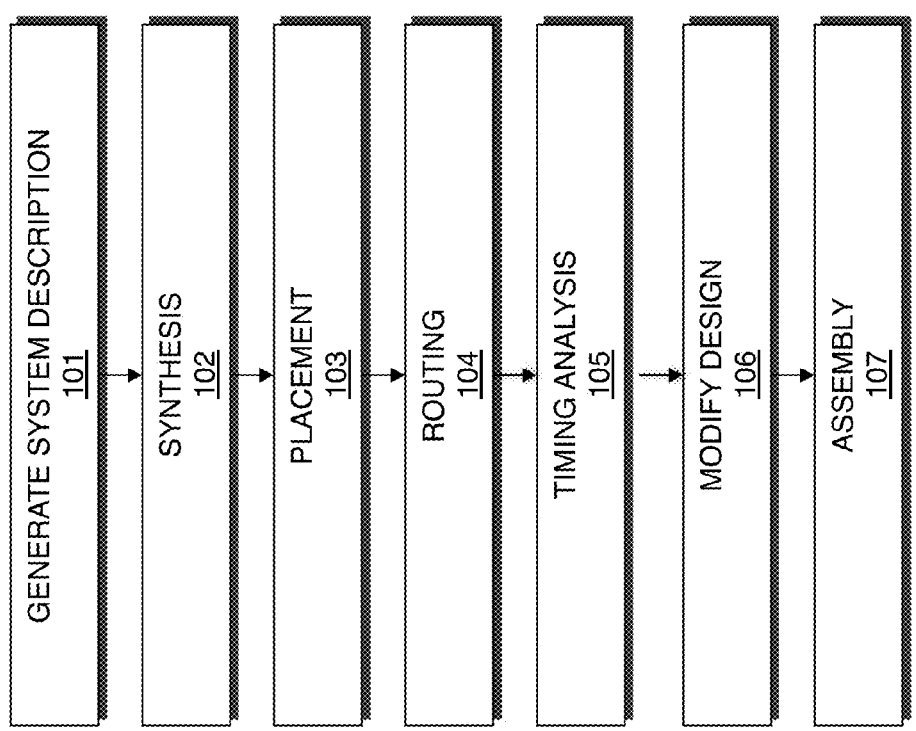
FIG. 1 is a flow chart illustrating a method for designing a system on a target device according to an exemplary embodiment of the present invention.

FIG. 1 is a flow chart illustrating a method for designing a system on a target device according to an exemplary embodiment of the present invention. The target device may be a field programmable gate array (FPGA), application specific integrated circuit (ASIC), a structured ASIC, or other programmable device. According to one embodiment, the procedure illustrated in FIG. 1 may be performed by a computer aided design (CAD)/electronic design automation (EDA) tool implemented on a computer system. At 101, a description of a system is generated. According to an embodiment of the present invention, a hardware description language (HDL) design definition is generated to describe the system. The HDL is generated in response to specifications of the system provided by a designer. The specifications may be provided through a design entry tool. The specifications may describe components and interconnections in the system.

At 102, the system is synthesized. Synthesis includes generating a logic design of the system to be implemented by the target device. According to an embodiment of the present invention, synthesis generates an optimized logical representation of the system from the HDL design definition. Synthesis also includes mapping the optimized logic design. Mapping includes determining how to implement logic gates and logic elements in the optimized logic representation with specific resources on the target device. According to an embodiment of the present invention, a netlist is generated from mapping. This netlist may be an optimized technology-mapped netlist generated from the HDL.

At 103, the system is placed. According to an embodiment of the present invention, placement involves placing the mapped logical system design on the target device. Placement works on the technology-mapped netlist to produce a placement for each of the functional blocks. According to an embodiment of the present invention, placement includes fitting the system on the target device by determining which resources on the logic device are to be used for specific logic elements, and other function blocks, determined to implement the system during synthesis. Placement may include clustering which involves grouping logic elements together to form the logic clusters present on the target device. According to an embodiment of the present invention, clustering is performed at an early stage of placement and occurs directly after synthesis during the placement preparation stage.

At 104, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 105, timing analysis is performed on the system designed by procedures 101-104. According to an embodiment of the present invention, the timing analysis determines whether timing constraints of the system are satisfied. In addition, the timing analysis also checks to see whether intermediate node corruption occurs on data paths of the system due to rise/fall skew resulting in data not being sampled at a destination. According to an embodiment of the present invention, data corruption occurs when an intended data value no longer reaches its intended destination.

At 106, the design for the system is modified in response to the timing analysis. According to an embodiment of the present invention, the design for the system may be modified in response to determining that timing constraints have not been satisfied or that intermediate node corruption will or may occur. The design for the system may be modified by a designer manually or alternatively the design may be modified automatically by the EDA tool by re-executing one or more of procedures 102-104. It should also be appreciated that each procedure may perform this optimization in its first invocation by performing the analysis during its execution.

At 107, an assembly procedure is performed. The assembly procedure involves creating a data file that includes information determined by the procedures described at 101-106. The data file may be a bit stream that may be used to program a target device. According to an embodiment of the present invention, the procedures illustrated in FIG. 1 may be performed by an EDA tool executed on a first computer system.

The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. The target device may be programmed with the data file. By programming the target with the data file, components on the target device are physically transformed to implement the system.

Figure 2:
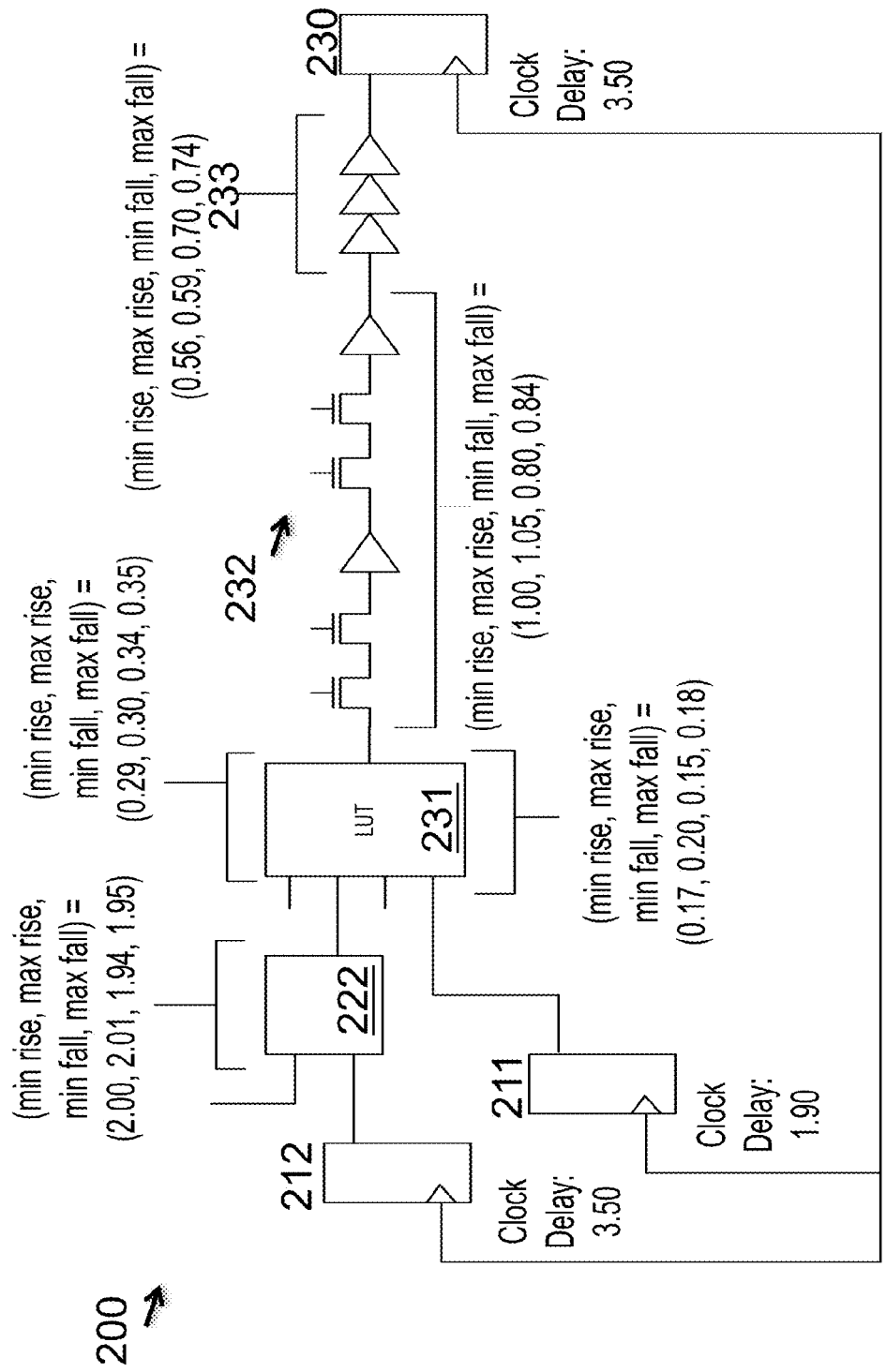
FIG. 2 illustrates a first topology upon which timing analysis may be performed according to one embodiment of the present invention.

FIG. 2 illustrates a first topology 200 upon which timing analysis may be performed according to one embodiment of the present invention. The exemplary topology 200 includes a section on a target device according to an embodiment of the present invention. The topology 200 is typical of data paths inside an FPGA that are clocked with locally-routed clocks. In topologies like these, clock skew can change, by advancing, when corrupting "next-cycle" edges are inserted into logic cones. This can disrupt the propagation of signals that are meant to be latched in a current cycle. The topology 200 includes a first data path between a first source register 211 and a destination register 230. The first data path traverses a look up table (LUT) 231, a first set of components 232 that include transistors and buffers, and a second set of components 233 that include a plurality of buffers. The topology 200 includes a second data path between a second source register 212 and the destination register 230. The second data path traverses a third component 222, the LUT 231, the first set of components 232, and the second set of components 233.

A data signal on the first data path or the second data path has associated uncertainty related to its arrival that is modeled by a minimum/maximum spread for both rising and falling edges. The minimum rise, maximum rise, minimum fall, and maximum fall time for each of the components are provided on FIG. 2. The end of this timing path, after the LUT, is also typical of the data paths of high-speed source-synchronous interfaces which handle relatively small timing windows that collapse as timing edges propagate through the data paths.

As the data signal propagates through LUTs and components which include pass gates and buffers, the rising and falling edges experience different delays. In addition, the minimum/maximum uncertainties act to increase the ambiguity when rising and falling edges arrive at the destination register 230. Considering both of these effects, timing analysis checks the latest arrival time of all edges relevant to setup arrival before a clock sampling instant and the earliest arrival time of all edges relevant to hold arrival after that instant. The margin between when edges arrive and the sampling instant is referred to as timing slack.

Traditional timing analysis techniques of comparing the latch time at the destination register 230 with respect to edges relevant to setup and edges relevant to hold would indicate that the first and second data paths meet timing. The following setup and hold time margins at the destination register 230 would be computed for a clock period of 4.00 ns, and with the assumption that all logic in the paths are positive unate, and that LUT 231 is implementing an AND gate.

Setup Margin ($ns$): (4.00+3.50)−max(3.50+2.01+
0.30+1.05+0.59,3.50+1.95+0.35+0.84+0.74)
=0.05

Hold Margin ($ns$): (1.90+0.17+1.00+0.56,1.90+0.15+
0.80+0.70)−(3.50)=0.05

Since the timing analysis computes that the setup and hold time slack values are positive, the first and second data paths through the topology 200 are assumed by traditional timing analysis to satisfy timing. However, the functionality of the design is also contingent on the proper transitioning of the intermediate nodes so that the destination register 230 will receive the appropriate logic values.

According to an embodiment of the present invention, timing analysis is performed at one or more nodes throughout each data path of the topology 200. An analysis performed at node 240 of topology 200 yields the following arrival times for the same set of transitions.

For the first data path, the earliest arrival time of falling edge at node 240 may be computed as follows.

Earliest arrival time of falling edge at node 240 (*ns*):
4.00+1.90+0.15+0.80=6.85

For the second data path, the latest arrival time of rising edge at node 240 may be computed as follows.

Latest arrival time of rising edge at node 240 (*ns*):
3.50+2.01+0.30+1.05=6.86

Since the current-cycle rising edge can arrive after the next-cycle falling edge, this means that the output at node 240 may never transition high. Therefore, even though traditional timing analysis may report that topology 200 may function properly, correct data values will not appear at node 240 and propagate to the destination to be latched in the current cycle.

For example, a failure may result if a rising edge (setup) is followed by a falling edge (hold) because a high pulse may not propagate through node 240 since the latest rising (setup) edge can arrive is 6.86 ns, while the earliest falling (hold) edge can arrive is 6.85 ns. This effectively means that the high pulse can be squished away and does not make it through the intermediate node.

Once a pulse is squished away, there is nothing to propagate to the destination register 230. As a result, the high signal will never be latched. FIG. 3A illustrates a traditional analysis of rise/fall skew squishing a pulse. FIG. 3A illustrates what traditional timing analysis believes will appear at the destination register 230 since it looks only at the sum of all rise delays and fall delays without considering intermediate nodes. FIG. 3B illustrates what really occurs when an intermediate node never toggles fully, and the high value never makes it to the destination register 230. The deficiency of traditional timing analysis is that it makes the erroneous assumption that all edges persist even when they slide past each other and that a pulse that is squished away can be stretched back into place.

The challenge with performing timing analysis for intermediate nodes on data paths is that the corruption of signals relevant to a current clock cycle can occur in response to signals intended for a next clock cycle coming from other data path branches. According to an embodiment of the present invention, general arrival time computation used for computing setup and hold slacks, which handles all the varieties of data path topologies, is leveraged to perform intermediate node checks.

According to an embodiment of the present invention, hold arrival time computation is performed with data that is launched with clock edge at t=period, where period is a clock period associated with a source register. For computing hold slacks, the latch edge is also computed with data launched with clock edge at t=period.

Figure 4:
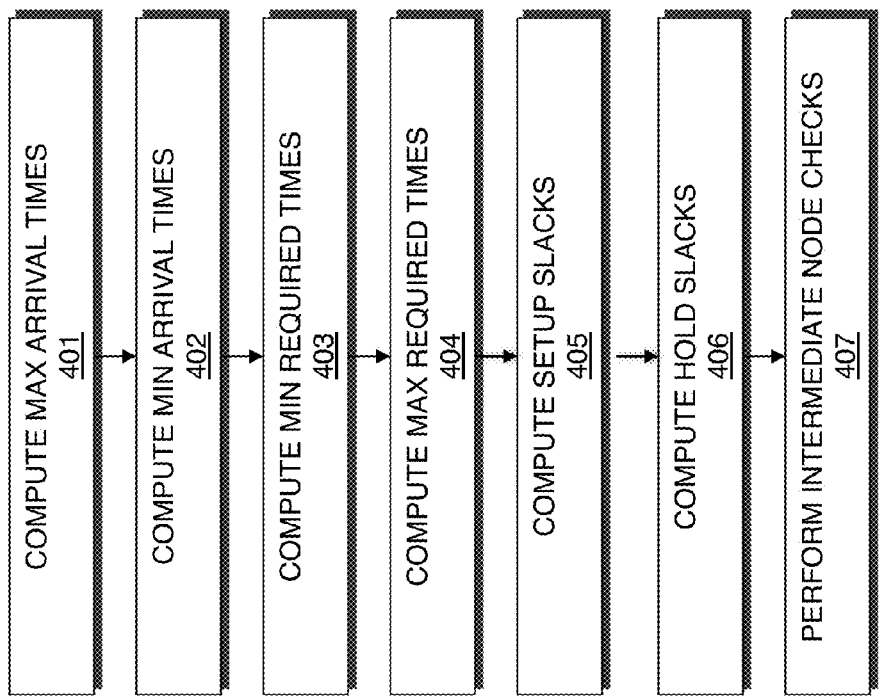
FIG. 4 is a flow chart illustrating a method for performing timing analysis that accounts for rise/fall skew according to a first embodiment of the present invention.

FIG. 4 is a flow chart illustrating a method for performing timing analysis that accounts for the impact of rise/fall skew on intermediate nodes according to a first embodiment of the present invention. At 401, maximum arrival times are computed from a source register to a destination register based on data launch time at a first point of time. The first point of time may be t=0. According to an embodiment of the present invention, the maximum arrival time includes a maximum rise time and a maximum fall time that are derived by summing source clock and data delays according to standard techniques. According to an embodiment of the present invention, the maximum arrival time is computed for each intermediate node to the destinations.

At 402, minimum arrival times are computed from a source register to a destination register based on a data launch time at a second point of time which is a clock period after the first time, in one instance. The second point of time may be t=period. According to an embodiment of the present invention, the minimum arrival time includes a minimum rise time and a minimum fall time that are derived by summing source clock and data delays according to standard techniques. According to an embodiment of the present invention, minimum arrival times are computed for each intermediate node to the destinations.

At 403, minimum required times are computed at each intermediate node on the data path based on the second point of time. The minimum required time at a node is the time data needs to arrive at the node to meet clock constraints. According to an embodiment of the present invention, minimum required times may be computed by starting at the destination register and traversing backward on the data path and subtracting the maximum rise and fall delays to derive the minimum required times at a node.

At 404, maximum required times are computed at each intermediate node on the data path based on the second point of time. The maximum required time at a node is the time after which data needs to arrive at the node to satisfy hold constraints. According to an embodiment of the present invention, maximum required times may be computed by starting at the destination register and traversing backward on the data path and subtracting the minimum rise and fall delays to derive the maximum required times at a node.

At 405, setup slack times are computed for each edge based on maximum arrival times and minimum required times, as they are in traditional timing analysis. According to an embodiment of the present invention setup slack times may be computed by subtracting the maximum arrival time from the minimum required time.

At 406, hold slack times are computed for each edge based on minimum arrival times and maximum required times, as they are in traditional timing analysis. According to an embodiment of the present invention, hold slack time may be computed by subtracting the maximum required time from the minimal arrival time.

At 407, intermediate node checks are performed to assess the impact of rise/fall skew. According to an embodiment of the present invention, for each node, a maximum arrival time based on a data launch time at the first point of time is compared with a minimum arrival time based on a data launch time at the second point of time to determine whether there is early data corruption at the node.

Pseudo code for implementing timing analysis to compute setup/hold slacks and to perform intermediate node checks according to an embodiment of the present invention is shown below. The procedures illustrated in the pseudo code may be used to implement procedure 105 (shown in FIG. 1) in part.

Compute max arrival times based on t=0
Compute min arrival times based on t=period
Compute min required times based on t=period
Compute max required times based on t=period
Compute setup slacks based on max arrival times and min required times Compute hold slacks based on min arrival times and max required times Perform intermediate node checks by comparing max arrival times (based on t=0) with min arrival times (based on t=period)

According to an embodiment of the present invention, since intermediate node corruption occurs only on data transitions, the maximum fall arrival time is only compared against the minimum rise arrival time, and the maximum rise arrival time is compared against the minimum fall arrival time.

In the example illustrated above, a single clock is driving the first source register 211, the second source register 221, and the destination register 230 in the topology 200 illustrated in FIG. 2. When only a single clock is implemented to drive the source and destination registers, a launch time of t=period is recognized for the launch time of the corrupting data based on a valid data launch time of t=0.

Figure 5:
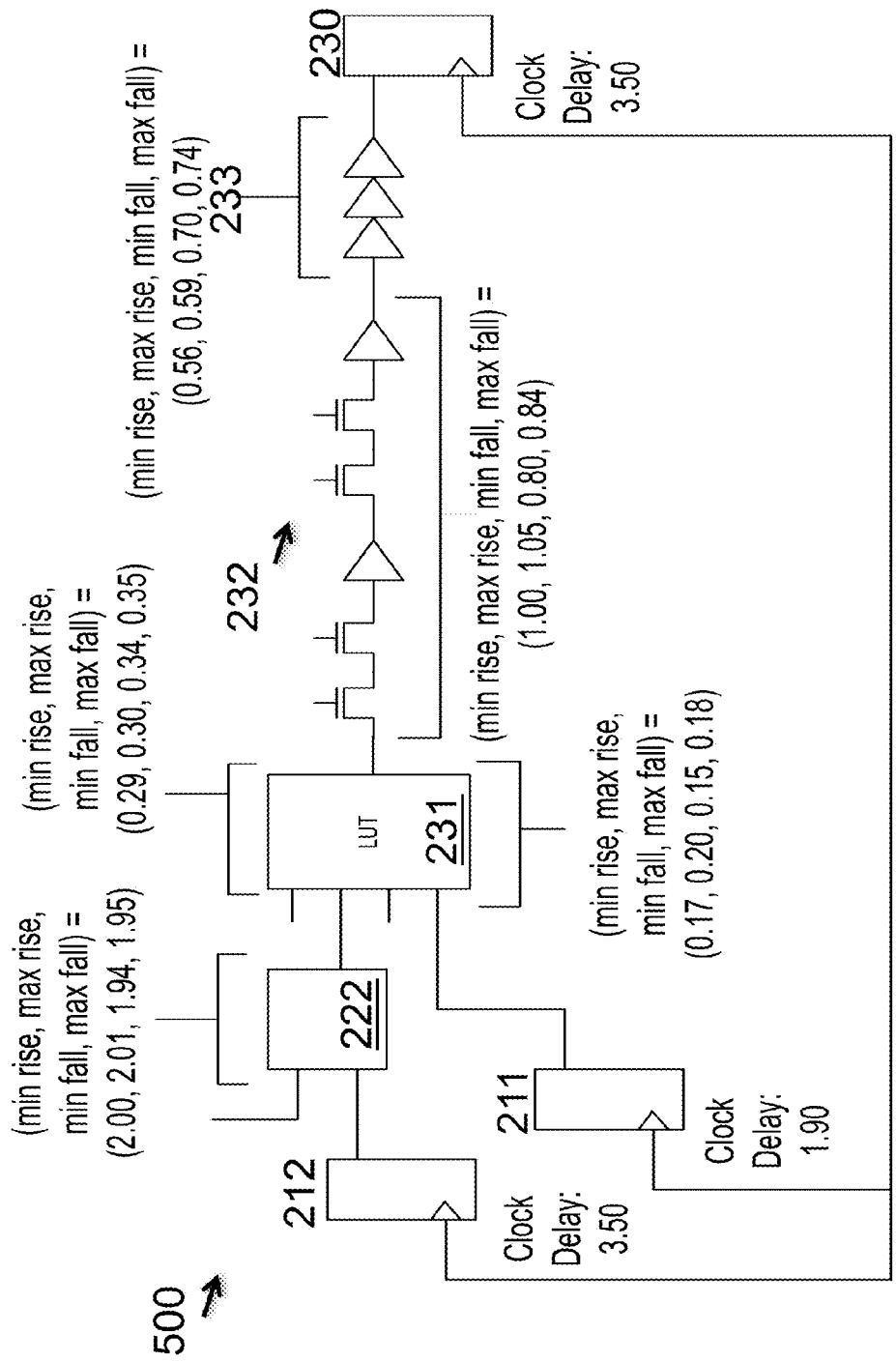
FIG. 5 illustrates a second topology upon which timing analysis may be performed according to one embodiment of the present invention.

FIG. 5 illustrates a topology 500 where a first source clock (source clock 1) drives first source register 211, a second source clock 212 (source clock 2) drives second source register 221, and a destination clock drives the destination register 230 according to an embodiment of the present invention. When more than one clock is implemented in a topology, different launch times should be considered when computing the arrival times for intermediate node checks.

Figure 6:
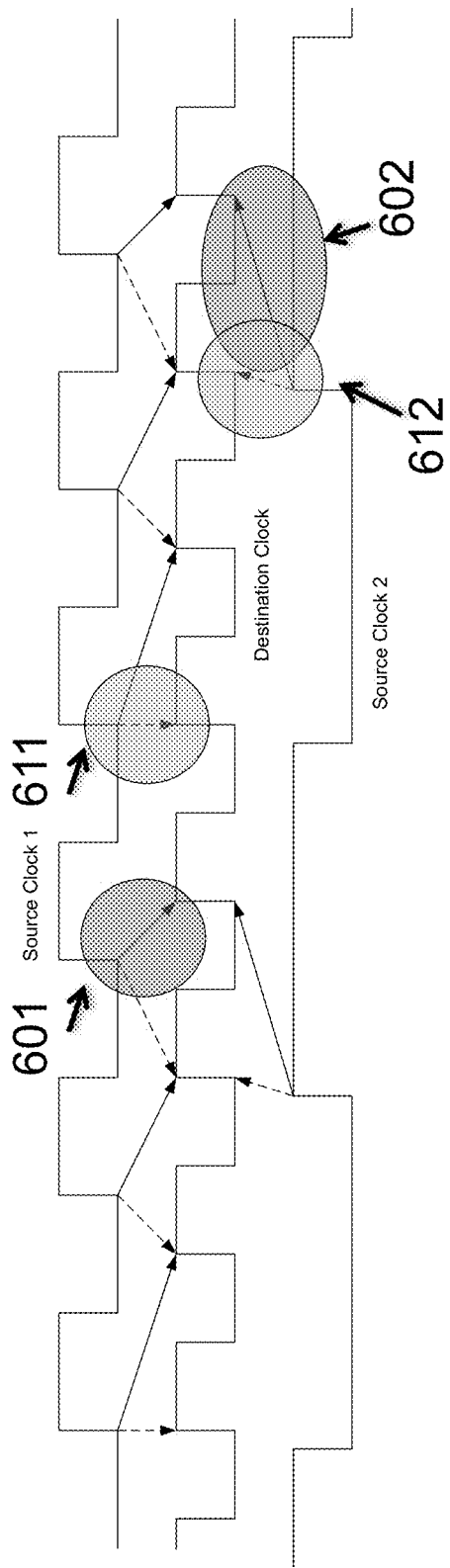
FIG. 6 is a timing diagram illustrating an earliest clock edge from a first source clock that may corrupt valid data.

According to an embodiment of the present invention, for each destination clock, a list of source clocks are identified. For each source and destination clock pair, a list of possible relationships will be identified. The relationships may be, for example, half-cycle, single cycle, multi-cycle, or other cycle relationships. FIG. 6 illustrates a first timing diagram for source clock 1, source clock 2 and destination clock. For each source/destination clock pair and relationship, setup and hold analysis will be performed based on the most restrictive timing transfer applicable to each. For example, for the timing transfers from source clock 1 and source clock 2 to destination clock, the "tightest" setup transfers, highlighted at 601 and 602, and the hold transfers, highlighted at 611 and 612, will be analyzed.

To perform intermediate node checks, minimum arrival times of corrupting transitions that correspond with maximum arrival times for each setup domain analysis are determined. Each setup domain may be uniquely identified by a source/destination clock pair and relationship. The corrupting transitions may originate from one of a number of source clocks corresponding to a setup domain. The corrupting transitions are analyzed to ensure that intermediate nodes are not corrupted. One way to identify the relevant set of source clocks and associated source registers is to traverse backwards from a destination register in a setup domain. For each potential corrupting source clock, an earliest clock edge from that clock that may corrupt valid data launched for the setup domain is identified. The time relative to the valid source clock edge is what is relevant. If the time relative to the valid source clock edge is determined to be Δt and the time valid data is launched is x, the time assumed for min corrupting arrival time computation is x+Δt.

As shown in FIG. 6, for the setup domain including source clock 1, the relevant corrupting transition from source clock 1 occurs one clock period after the time used for the launch of valid data.

Figure 7:
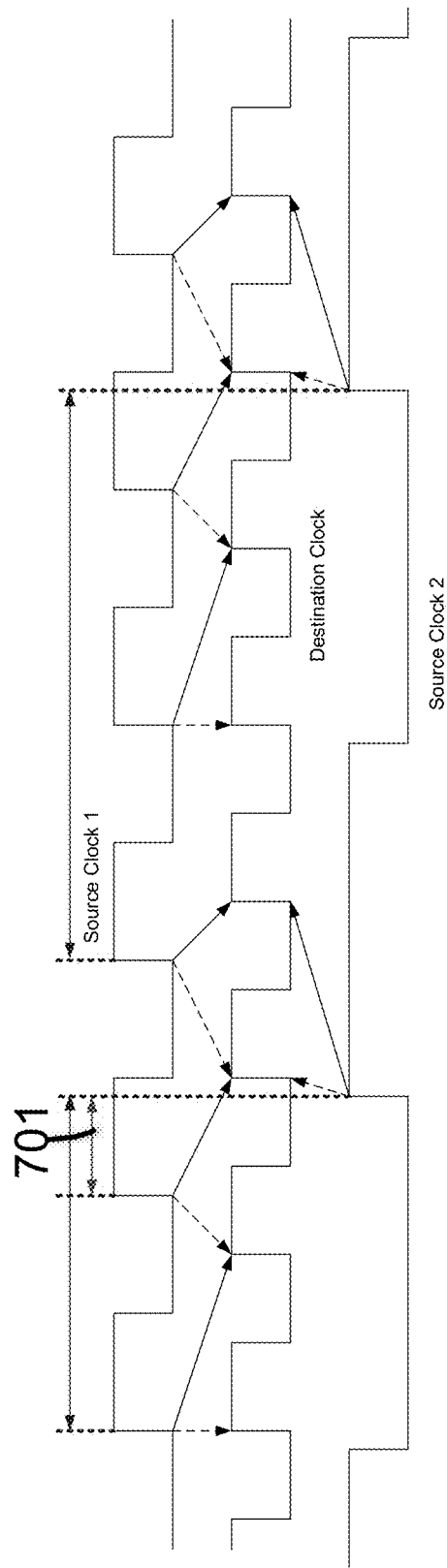
FIG. 7 is a timing diagram illustrating an earliest clock edge from a second source clock that may corrupt valid data.

FIG. 7 illustrates the timing diagram of FIG. 6 with further annotations. The relevant corrupting edge of source clock 2 is determined by considering the corrupting edge of source clock 2 for each of the setup transfers from source clock 1 to the destination clock. The earliest relative corrupting clock edge across all the setup transfers is highlighted by 701.

Minimum arrival times for corrupting transitions may be computed using the relative times of the corrupting transitions identified at FIGS. 6 and 7. For example, if the launch time for valid data was t=x, the minimum arrival times for corrupting data from source clock 1 would be computed based on a launch time of t=x+period of source clock 1, and the minimum arrival times for corrupting data from source clock 2 would be computed based on a launch time of t=x+ length of highlighted width illustrated at 701. The minimum arrival times could be computed from all the corrupting source registers identified. For all intermediate nodes relevant to the setup domain under analysis, the minimum corrupting arrival times can be compared against the maximum valid arrival times to evaluate whether intermediate nodes are suffering from early corruption. It should be appreciated that data such as the corrupting source register set and source clock relationships may be saved to avoid re-computation in subsequent timing analyses that may be performed on the same netlist.

Figure 8:
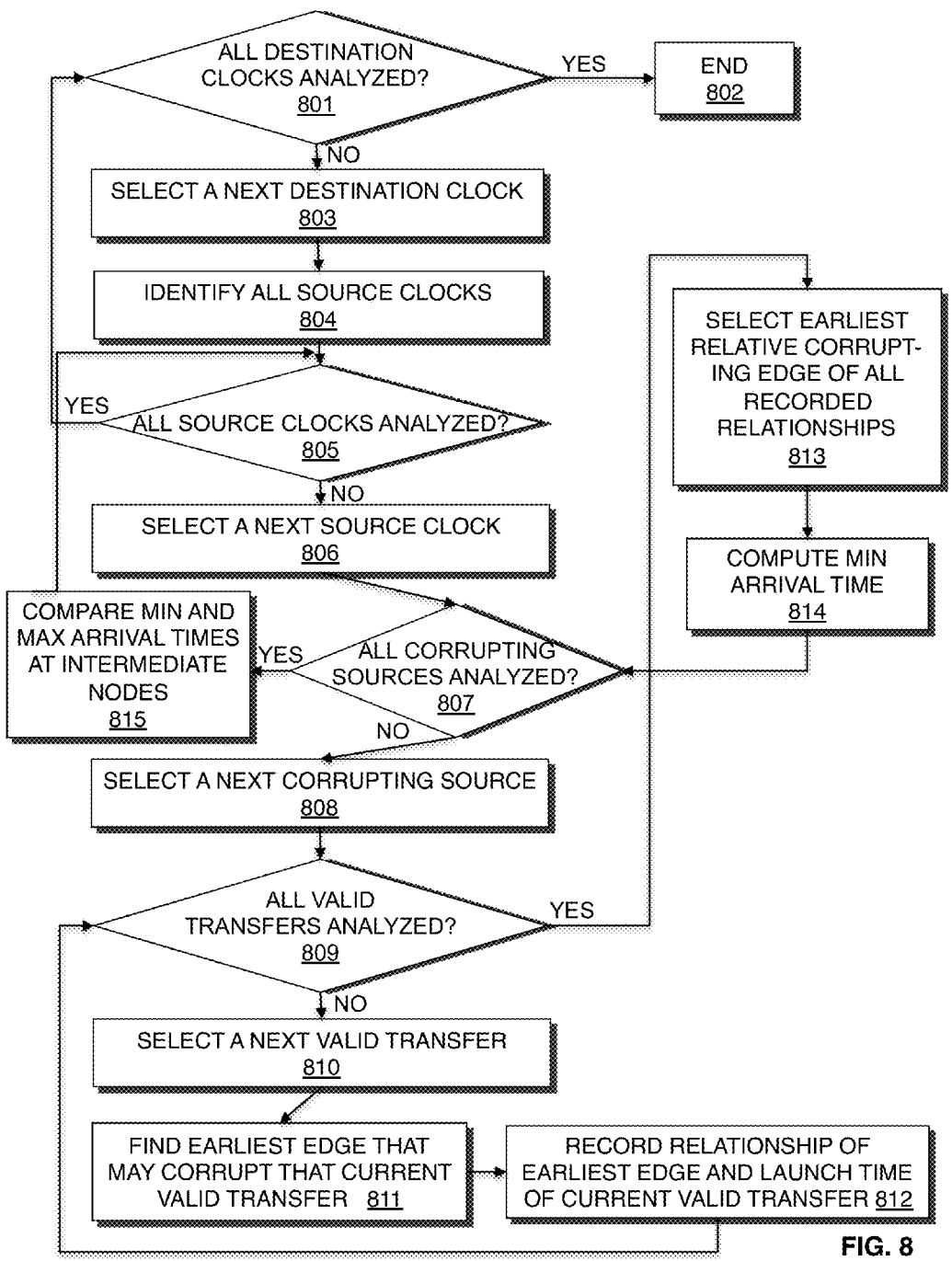
FIG. 8 is a flow chart illustrating a method for performing timing analysis that accounts for rise/fall skew according to a second embodiment of the present invention.

FIG. 8 is a flow chart illustrating a method for performing timing analysis that accounts for the impact of rise/fall skew on intermediate nodes according to a second embodiment of the present invention. At 801, a determination is made as to whether all destination clocks (d) have been analyzed. If all destination clocks have been analyzed, control proceeds to 802. If not all destination clocks have been analyzed, control proceeds to 803.

At 802, control terminates the process.

At 803, a next destination clock is selected for analysis.

At 804, all source clocks for the destination clock are identified.

At 805, a determination is made as to whether all source clocks (s) have been analyzed. If all source clocks have been analyzed, control returns to 801. If not all source clocks have been analyzed, control proceeds to 806.

At 806, a next source clock is selected for analysis.

At 807, a determination is made as to whether all source clocks have been analyzed as a corrupting source (s_corrupting). If all source clocks have been analyzed as a corrupting source, control returns to 815. If not all source clocks have been analyzed as a corrupting source, control proceeds to 808.

At 808, a next corrupting source is selected for analysis.

At 809, a determination is made as to whether all valid transfers (valid transfer) from the current source clock to the current destination clock have been analyzed. If all valid transfers have been analyzed, control proceeds to 813. If all valid transfers have not been analyzed, control proceeds to 810.

At 810, a next valid transfer is selected for analysis.

At 811, an earliest edge of the corrupting source that may launch data to corrupt the current valid transfer is identified.

At 812, a relationship between the earliest edge identified and a launch time of the current valid transfer is identified. Control returns to 809.

At 813, a most conservative relationship of all recorded relationships associated with the current corrupting source is selected. According to an embodiment of the present invention, the most conservative relationship is defined as the earliest relative corrupting clock edge.

At 814, minimum arrival times for corrupting data generated by the current corrupting source are computed based on the conservative corrupting relationship selected and the launch time assumed for the source clock. Control returns to 807.

At 815, the minimum arrival times associated with the corrupting source clocks are compared with the maximum arrival times associated with the current source clock at intermediate nodes to identify corruption. Control returns to 805.

Pseudo code for implementing timing analysis according to an embodiment of the present invention is shown below. The procedures illustrated in the pseudo code may be used to implement procedure 105 (shown in FIG. 1) in part and the method illustrated in FIG. 8.

```
For each destination clock, d
    Identify all source clocks for d
    For each source clock, s
        For each source clock, s_corrupting
        For each distinct valid transfer from s ->
            d based on alignment of s and d,
            valid_transfer
                Find the earliest edge of
                    s_corrupting that may launch
                    data to corrupt valid_transfer
                Record the relationship between
                    the earliest edge found and
                    launch time of valid_transfer
            Pick the most conservative relationship
                of all recorded relationships ("earliest
                relative corrupting clock edge")
            Compute min arrival times for
                corrupting data from s_corrupting
                based on the conservative relationship
                picked and the launch time assumed
                for s
        Compare the min arrival times with the max
            arrival times for the source clock s at
            intermediate nodes to look for corruption
```

According to an alternate embodiment of the present invention, when identifying a launch edge time associated with corrupting transitions, an earliest corrupting launch edge across all time considering all latch edges is selected. This launch edge can be compared against the most conservative launch edge assumed for valid data across all time considering all latch edges. This selection of corrupting launch edge time may be conservative because the latch edge corresponding to the corrupting launch may be different from the latch edge corresponding to the valid launch.

Figure 9:
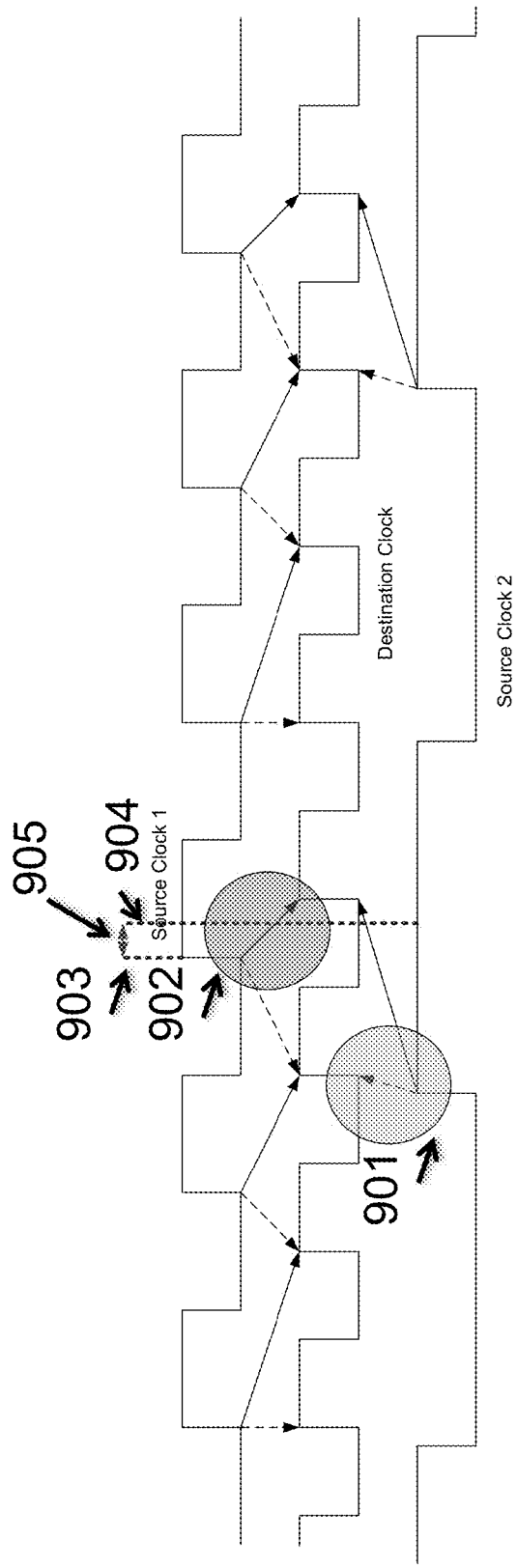
FIG. 9 is a timing diagram illustrating an earliest clock edge from a second source clock that may corrupt valid data using an alternate methodology.

Referring back to the earlier example described with reference to FIGS. 6 and 7, when analyzing whether data launched by source clock 2 can corrupt data launched by source clock 1, the most conservative launch edge assumed for corrupting data can be compared against the launch edge assumed for valid data. FIG. 9 is a timing diagram that illustrates an alternative methodology for identifying an earliest clock edge that may corrupt valid data. With reference to FIG. 9, the most conservative launch edge assumed for corrupting data is highlighted as 901. The launch edge assumed for valid data is highlighted as 902. The latch edges for the two transfers are distinct, but the following analysis can conservatively assume that they are the same for simplicity. The timing diagram in FIG. 9 illustrates the two launch times 903 and 904, and the relative time between the two launches 905. The left dotted line 903 corresponds to the actual launch time of source clock 1 for the given latch edge, but the right dotted line 904 is just the assumed corrupting launch time of source clock 2 based on the relative launch to latch relationships approximated by this simplified analysis.

Figure 10:
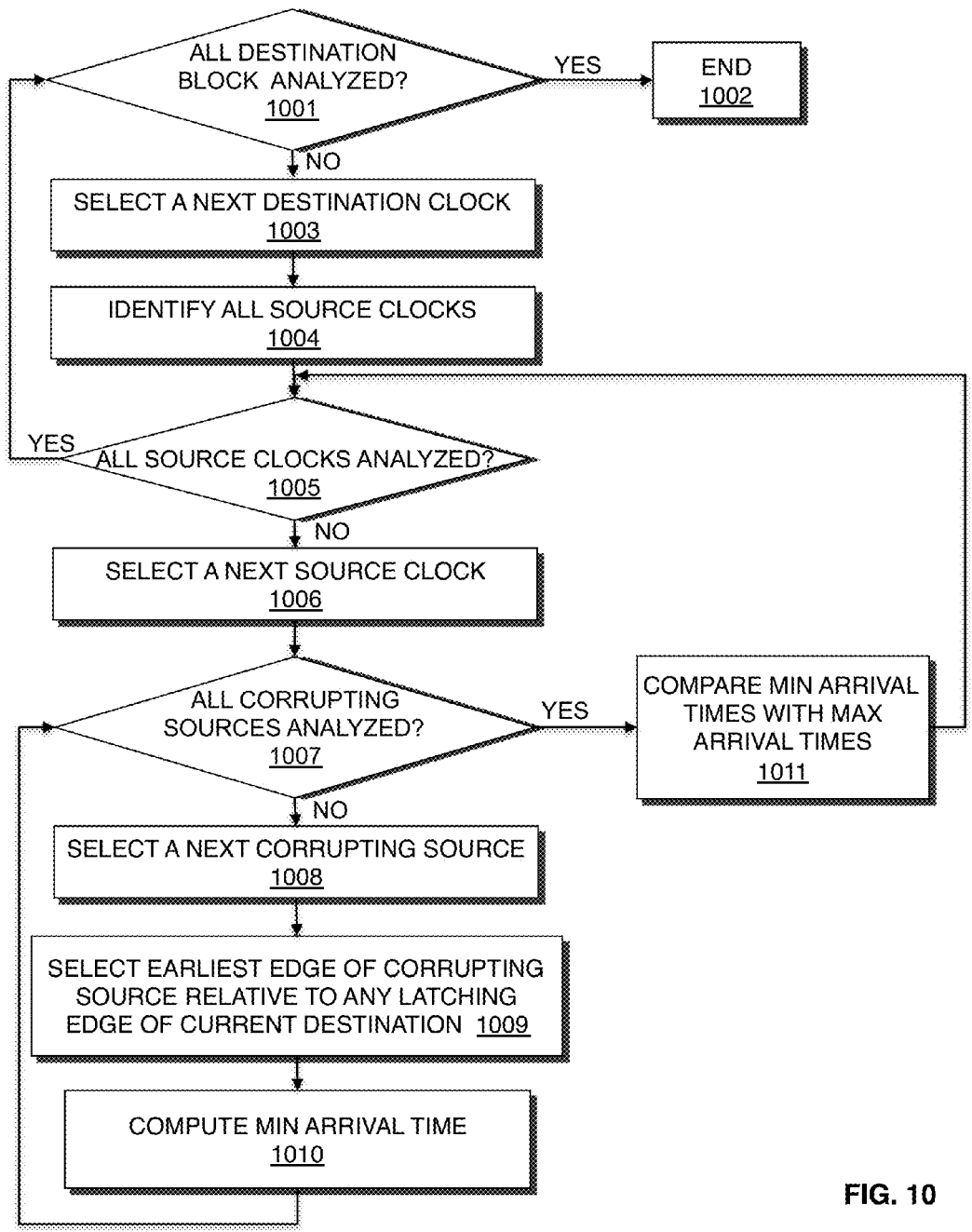
FIG. 10 is a flow chart illustrating a method for performing timing analysis that accounts for rise/fall skew according to a third embodiment of the present invention.

FIG. 10 is a flow chart illustrating a method for performing timing analysis that accounts for rise/fall skew of intermediate nodes according to a second embodiment of the present invention. At 1001, a determination is made as to whether all destination clocks (d) have been analyzed. If all destination clocks have been analyzed, control proceeds to 1002. If not all destination clocks have been analyzed, control proceeds to 1003.

At 1002, control terminates the process.

At 1003, a next destination clock is selected for analysis.

At 1004, all source clocks for the destination clock are identified.

At 1005, a determination is made as to whether all source clocks (s) have been analyzed. If all source clocks have been analyzed, control returns to 1001. If not all source clocks have been analyzed, control proceeds to 1006.

At 1006, a next source clock is selected for analysis.

At 1007, a determination is made as to whether all source clocks have been analyzed as a corrupting source (s_corrupting). If all source clocks have been analyzed as a corrupting source, control returns to 1011. If not all source clocks have been analyzed as a corrupting source, control proceeds to 1008.

At 1008, a next corrupting source is selected for analysis.

At 1009, an earliest edge of the current corrupting source is selected relative to any latching edge of the current destination clock.

At 1010, minimum arrival times for corrupting data from the current corrupting source is computed based on the earliest edge selected and the launch time assumed for s. According to an embodiment of the present invention, an assumption is made that the current corrupting source is targeting the same latching edge of the current destination clock. Control returns to 1007.

At 1011, the minimum arrival times associated with the corrupting source clocks are compared with the maximum arrival times associated with the current source clock at intermediate nodes to identify corruption. Control returns to 1005.

Pseudo code for implementing timing analysis according to an embodiment of the present invention is shown below. The procedures illustrated in the pseudo code may be used to implement procedure 105 (shown in FIG. 1) in part and the method illustrated in FIG. 10.

```
For each destination clock, d
    Identify all source clocks for d
    For each source clock, s
        For each source clock, s_corrupting
            Pick the earliest edge of s_corrupting,
                relative to any latching edge of d
            Compute min arrival times for
                corrupting data from s_corrupting
                based on the earliest edge of
                s_corrupting picked and the launch
                time assumed for s, assuming they are
                targeting the same latching edge of d
        Compare the min arrival times with the max
            arrival times for the source clock s at
            intermediate nodes to look for corruption
```

FIGS. 1, 4, 8, and 10 are flow charts that illustrate embodiments of the present invention. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

According to an embodiment of the present invention, optimization may be performed to avoid timing failures at the intermediate nodes. To facilitate optimization, slack computation may be adjusted based on the timing relationships at these intermediate nodes. Typically, when setup slacks are being computed, arrival times are compared against required times, with slack being defined as required time minus arrival time. Arrival times are generally a function of the launch clock edge, source clock delay, and data path delays from source registers to the respective nodes. Required times are generally a function of latch clock edge, destination clock delay, and data path delays from destination registers to the respective nodes.

Traditional setup slack computation can be modified to compute slacks that are a function of intermediate node relationships by modifying each required time to be the minimum of the traditionally computed required time, based on destination register timing, and the minimum arrival time of the corrupting edge(s) computed for the intermediate node checks described minus the pulse width requirement. Those modified required times will be propagated by the required time traversal so that nodes closer to the beginning of timing paths see the implications of the restrictions of all nodes and registers downstream, similar to a standard required time traversal. Setup slacks computed from these modified required times can be used to guide optimization to reduce maximum arrival times of valid data to meet intermediate node checks, in addition to register setup times.

Hold slack computation can be similarly modified, but in this case, the required time for hold slack computation would be the maximum of the traditionally computed required time, based on destination register timing, and the maximum arrival time of the valid edge(s) computed for the intermediate node checks described plus the pulse width requirement. These required times would be compared against the min arrival times of corrupting edges to compute hold slacks. These hold slacks can be used to guide optimization to increase minimum arrival times of corrupting data to prevent intermediate node corruption.

It should be noted that either decreasing maximum arrival times of valid edges or increasing minimum arrival times of corrupting edges is sufficient to resolve intermediate node corruption. For optimization algorithms that optimize both setup and hold, some embodiments may partially adjust requirements so the burden of optimization is divided between setup and hold optimization by dividing the failure magnitude (maximum arrival time+pulse width requirement−minimum arrival time) between them when computing new requirements. Different proportions can be used for the division and the amounts applied can be overlapping (the two amounts can add to more than the failure magnitude) to add conservatism, if appropriate.

Figure 11:
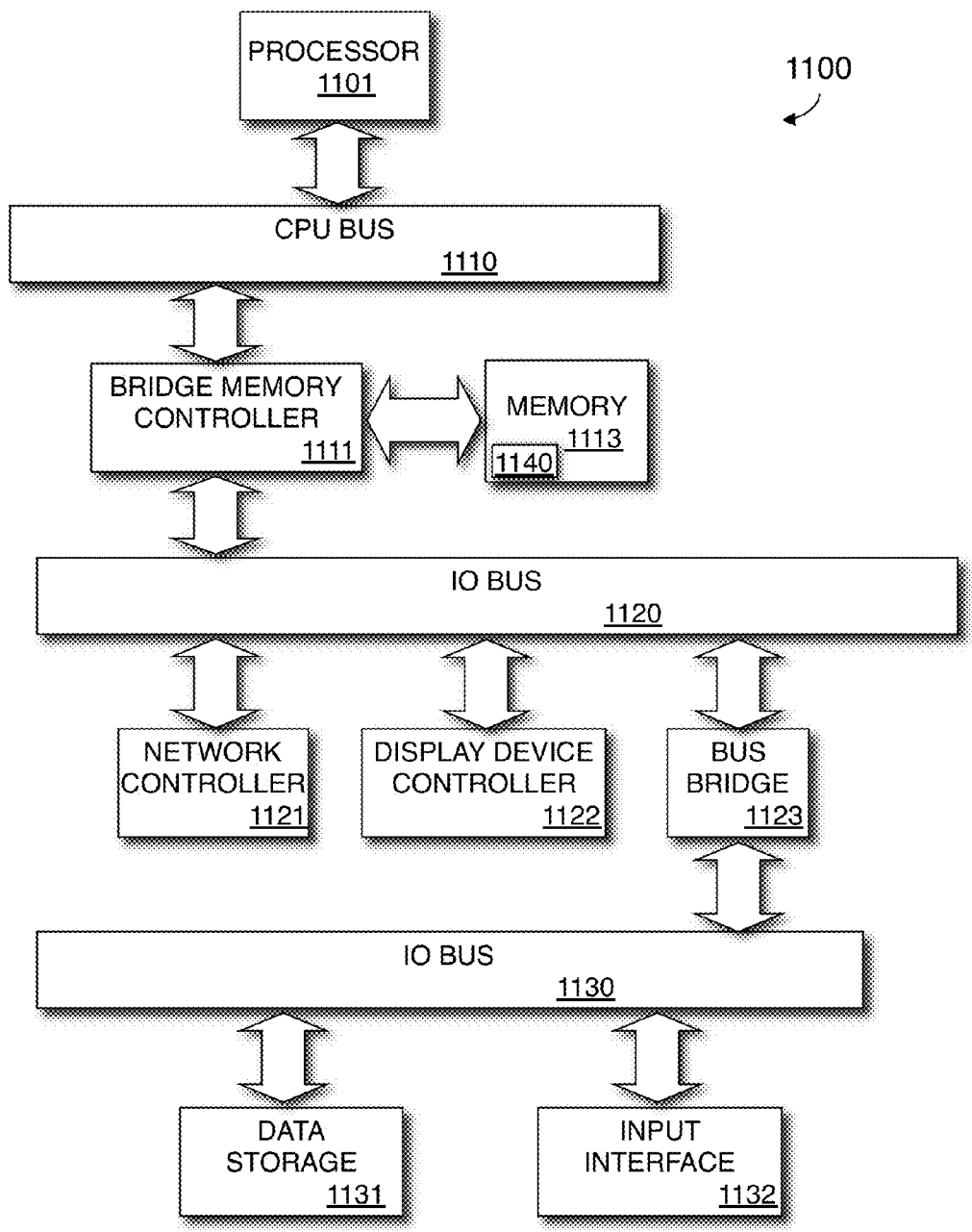
FIG. 11 illustrates a block diagram of a computer system implementing a system designer according to an embodiment of the present invention.

FIG. 11 is a block diagram of an exemplary computer system 1100 in which an example embodiment of the present invention resides. The computer system 1100 includes a processor 1101 that process data signals. The processor 1101 is coupled to a CPU bus 1110 or other switch fabric that transmits data signals between processor 1101 and other components in the computer system 1100.

The computer system 1100 includes a memory 1113. The memory 1113 may store instructions and code represented by data signals that may be executed by the processor 1101. A bridge memory controller 1111 is coupled to the CPU bus 1110 and the memory 1113. The bridge memory controller 1111 directs data signals between the processor 1101, the memory 1113, and other components in the computer system 1100 and bridges the data signals between the CPU bus 1110, the memory 1113, and a first IO bus 1120. According to an embodiment of the present invention, the processor 1101 may be directly coupled to the memory 1113 and communicates with the memory 1113 without a bridge memory controller 1111.

The first IO bus 1120 may be a single bus or a combination of multiple buses. The first IO bus 1120 provides communication links between components in the computer system 1100. A network controller 1121 is coupled to the first IO bus 1120. The network controller 1121 may link the computer system 1100 to a network of computers (not shown) and supports communication among the machines. A display device controller 1122 is coupled to the first IO bus 1120. The display device controller 1122 allows coupling of a display device (not shown) to the computer system 1100 and acts as an interface between the display device and the computer system 1200.

A second IO bus 1130 may be a single bus or a combination of multiple buses. The second IO bus 1130 provides communication links between components in the computer system 1100. A data storage device 1131 is coupled to the second IO bus 1130. An input interface 1132 is coupled to the second IO bus 1130. The input interface 1132 allows coupling of an input device to the computer system 1100 and transmits data signals from an input device to the computer system 1100. A bus bridge 1123 couples the first IO bus 1120 to the second IO bus 1130. The bus bridge 1123 operates to buffer and bridge data signals between the first IO bus 1120 and the second IO bus 1130. It should be appreciated that computer systems having a different architecture may also be used to implement the computer system 1100.

A system designer 1140 may reside in memory 1113 and be executed by the processor 1101. The system designer 1140 may operate to generate HDL, synthesize a system, place the system on a target device, route the system on the target device, perform timing analysis, and assemble the system.

Figure 12:
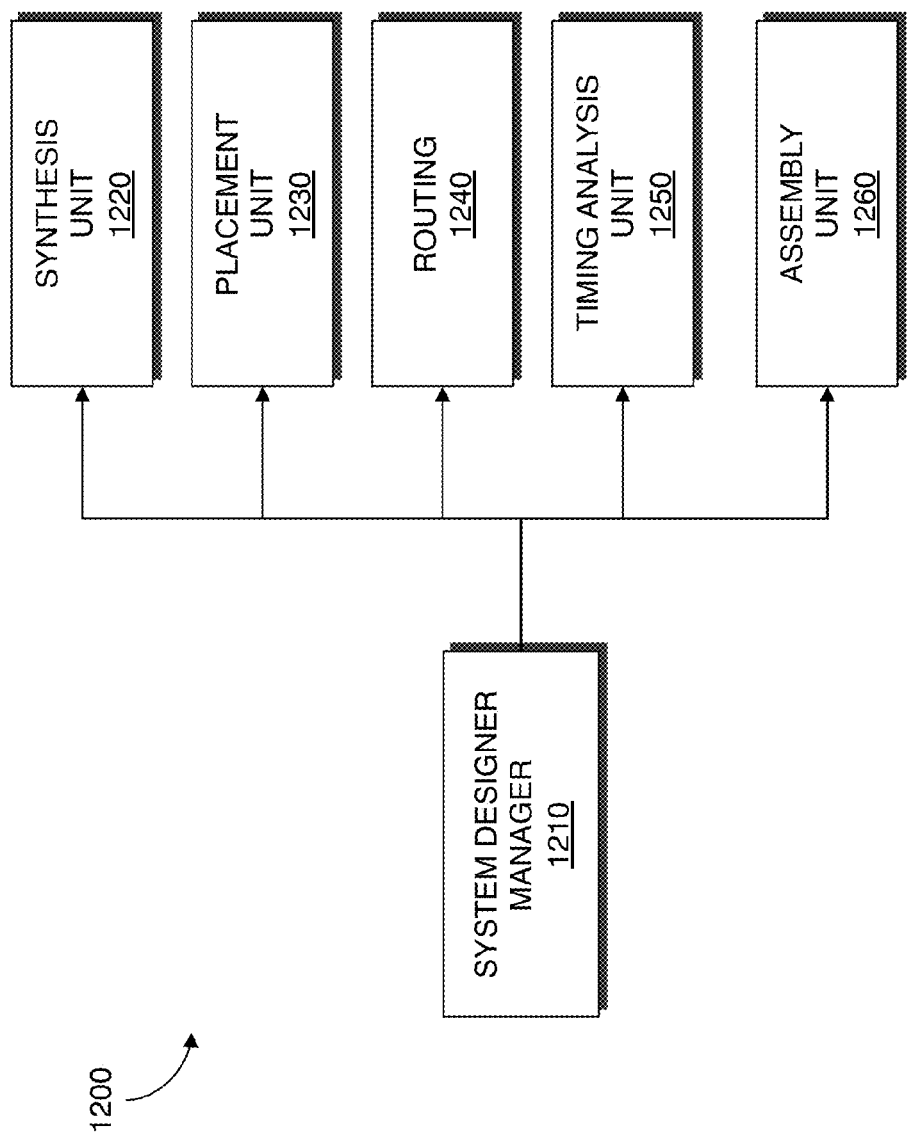
FIG. 12 is a block diagram of a system designer according to an embodiment of the present invention.

FIG. 12 illustrates a system designer 1200 according to an embodiment of the present invention. The system designer 1200 may be an EDA tool for designing a system on a target device such as an FPGA, structured application-specific integrated circuit (ASIC), ASIC, or other circuitry. FIG. 12 illustrates modules implementing an embodiment of the system designer 1200. According to one embodiment, the modules represent software modules and system design may be performed by a computer system such as the one illustrated in FIG. 11 executing sequences of instructions represented by the modules shown in FIG. 12. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 1200 includes a designer manager 1210. The designer manager 1210 is connected to and transmits data between the components of the system designer 1200. The designer manager 1210 also generates a representation of the system from a description of the system input by a designer. According to an embodiment of the present invention, the representation of the system generated may be a register transfer language (RTL) representation in a hardware description languages such as Verilog, very-high-speed integrated circuit (VHSIC) hardware description language (VHDL), or other descriptive language.

The system designer 1200 includes a synthesis unit 1220 that performs synthesis. The synthesis unit 1220 generates a logic design of a system to be implemented on the target device. According to an embodiment of the system designer

1200, the synthesis unit 1220 takes a conceptual HDL design definition and generates an optimized logical representation of the system. The optimized logical representation of the system generated by the synthesis unit 1210 may include a representation that has a reduced number of functional blocks and registers, such as logic gates and logic elements, required for the system. Alternatively, the optimized logical representation of the system generated by the synthesis unit 1220 may include a representation that has a reduced depth of logic and that generates a lower signal propagation delay.

The synthesis unit 1220 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing (DSP) blocks, input output (IO) elements or other components.

The system designer 1200 includes a placement unit 1230 that processes the optimized technology-mapped netlist to produce a placement for each of the functional blocks. The placement identifies which components or areas on the target device are to be used for specific functional blocks and registers.

The system designer 1200 includes a routing unit 1240 that performs routing. The routing unit 1240 determines the routing resources on the target device to use to provide interconnection between the components implementing functional blocks and registers of the logic design.

The system designer 1200 includes a timing analysis unit 1250 that performs timing analysis to determine whether timing constraints of the system are satisfied. In addition, the timing analysis also checks to see whether intermediate node corruption occurs on data paths of the system due to rise/fall skew resulting in data not being sampled at a destination register. According to an embodiment of the present invention, the timing analysis unit 1250 may operate to perform the procedures described with reference to FIGS. 4, 8, and 10.

The system designer 1200 includes an assembly unit 1260 that performs an assembly procedure that creates a data file that includes the design of the system generated by the system designer 1200. The data file may be a bit stream that may be used to program the target device. The assembly unit 1260 may output the data file so that the data file may be stored or alternatively transmitted to a separate machine used to program the target device. It should be appreciated that the assembly unit 1260 may also output the design of the system in other forms such as on a display device or other medium.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 13:
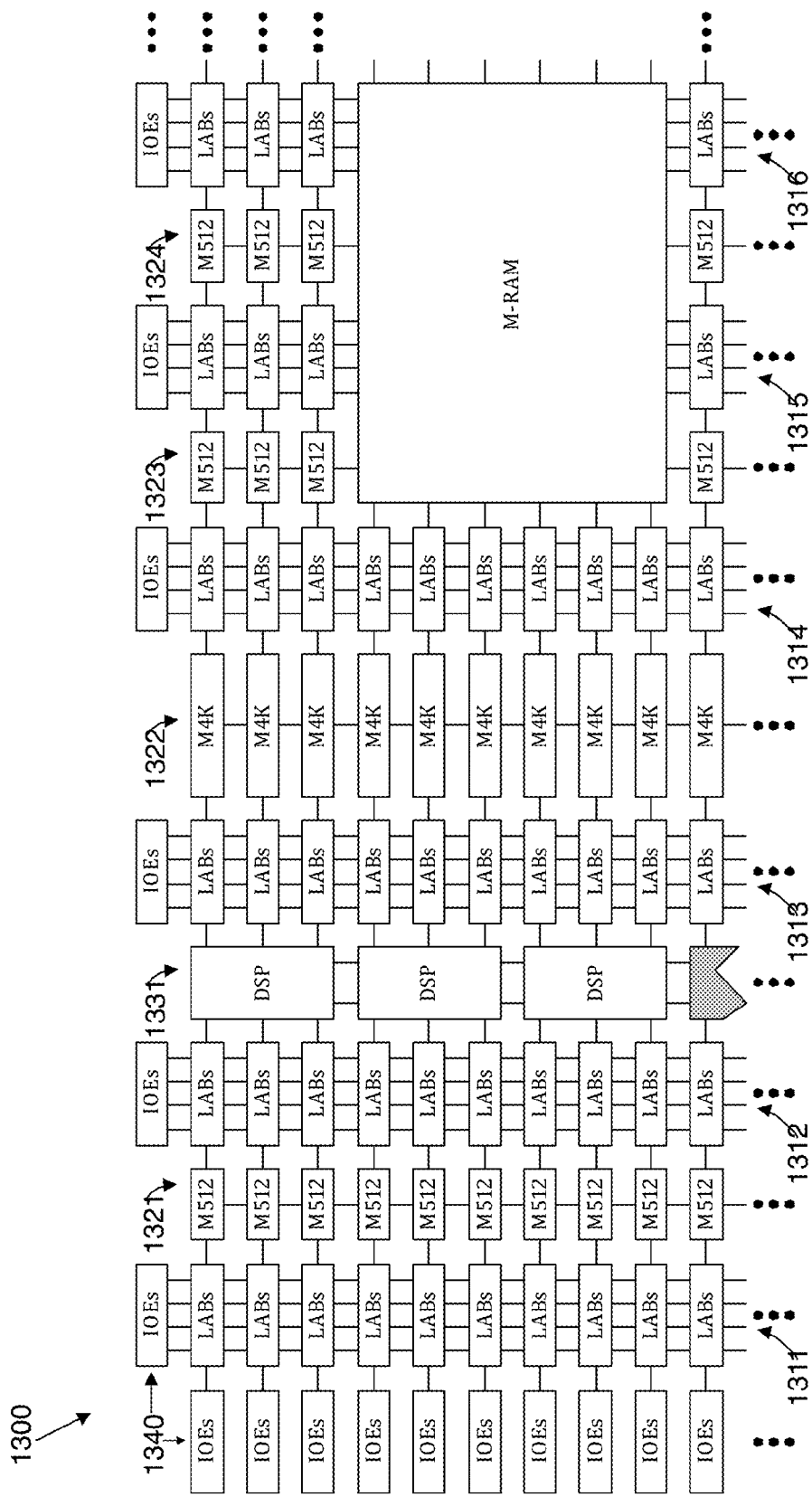
FIG. 13 illustrates an exemplary target device according to an embodiment of the present invention.

FIG. 13 illustrates a device 1300 that may be used to implement a target device according to an embodiment of the present invention. The device 1300 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 1300. Columns of LABs are shown as 1311-1316. It should be appreciated that the logic block may include additional or alternate components.

The device 1300 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1300. Columns of memory blocks are shown as 1321-1324.

The device 1300 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1300 and are shown as 1331.

The device 1300 includes a plurality of input/output elements (IOEs) 1340. Each IOE feeds an IO pin (not shown) on the device 1300. The IOEs 1340 are located at the end of LAB rows and columns around the periphery of the device 1300. Each IOE may include a bidirectional 10 buffer and a plurality of registers for registering input, output, and output-enable signals.

The device 1300 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodi-

What is claimed is:

1. A method for designing a system on a target device, the method comprising:
performing timing analysis at an intermediate node on a data path from a source to a destination to determine whether rise and fall skew of components on the data path result in data being corrupted before being sampled at the destination.

2. The method of claim 1, wherein performing timing analysis comprises:
comparing a maximum arrival time of data on the data path at the intermediate node with a minimum arrival time of corrupting data on the data path at the intermediate node.

3. The method of claim 2 further comprising:
computing the maximum arrival time relative to a launch time at a first point in time; and
computing the minimum arrival time relative to a launch time at the first point of time plus a period of a clock associated with the source.

4. The method of claim 2, wherein the maximum arrival time comprises a largest value that is a function of a maximum rise times and a maximum fall times of components on the data path from sources to the intermediate node.

5. The method of claim 2, wherein the minimum arrival time comprises a smallest value that is a function of minimum rise times and a minimum fall times of components on the data path from sources to the intermediate node.

6. The method of claim 2 further comprising:
identifying a corrupting source clock;
identifying an earliest clock edge from the corrupting source clock that corrupts valid data;
computing the maximum arrival time relative to a launch time at a first point in time; and
computing the minimum arrival time relative to a launch time at the first point of time plus a period of time associated with the earliest clock edge from the corrupting source clock.

7. The method of claim 6, wherein identifying the earliest clock edge comprises identifying the earliest clock edge across all latch edges.

8. The method of claim 1 further comprising computing setup slack from a maximum arrival time and a minimum required time.

9. The method of claim 8, wherein the minimum required time is computed from destination register timing, a minimum arrival time of a corrupting edge, and a pulse width requirement.

10. The method of claim 1 further comprising computing hold slack from a minimum arrival time and a maximum required time.

11. The method of claim 10, wherein the maximum required time is computed from destination register timing, a maximum arrival time of a valid edge, and a pulse width requirement.

12. The method of claim 1 further comprising modifying one or more of synthesis, placement, and routing on the target device in response to determining that the data is not being sampled at the destination because of intermediate node corruption.

13. The method of claim 1 further comprising sending a notification to a user in response to determining that the data is not being sampled at the destination because of intermediate node corruption.

14. The method of claim 1, wherein rise and fall skew occurs when there is a difference in rise time and fall time required for pulling up and pulling down a signal of the components.

15. A non-transitory computer readable medium including a sequence of instructions stored thereon for causing a computer to execute a method comprising:
identifying one or more source clocks associated with a destination clock;
associating each of the one or more source clocks as a corrupting source clock;
identifying an earliest edge associated with each of the corrupting source clocks that impacts data on a data path to one or more destinations; and
comparing a maximum arrival time from a source clock of the data on the data path at an intermediate node on the data path with a minimum arrival time from each of the corrupting source clocks of the data on the data path at the intermediate node, wherein the minimum arrival time of the data is computed relative to a time associated with the earliest clock edge, to determine whether corruption would result in the data not being sampled at the destination.

16. The non-transitory computer readable medium of claim 15, wherein identifying the earliest edge associated with each corrupting source clock comprises identifying an earliest clock edge that launches the data to corrupt a valid transfer.

17. The non-transitory computer readable medium of claim 15, wherein identifying the earliest edge associated with each corrupting source clock comprises identifying an earliest clock edge across all latch edges.

18. The non-transitory computer readable medium of claim 15, wherein the maximum arrival time comprises a largest value that is a function of maximum rise times and maximum fall times of the components on the data path from sources to the intermediate node.

19. The non-transitory computer readable medium of claim 15, wherein the minimum arrival time comprises a smallest value that is a function of minimum rise times and minimum fall times of the components on the data path from sources to the intermediate node.

20. The non-transitory computer readable medium of claim 15, wherein the method further comprises modifying one or more of synthesis, placement, and routing on a target device in response to determining that the data is not being sampled at the destination because of intermediate node corruption.

21. The non-transitory computer readable medium of claim 15, wherein the method further comprises sending a notification to a user in response to determining that the data is not being sampled at the destination because of intermediate node corruption.

22. A system designer comprising:
a synthesis unit;
a placement unit;
a routing unit; and
a timing analysis unit operable to perform timing analysis at an intermediate node on a data path from a source to a destination to determine whether rise and fall skew of components on the data path could result in data being corrupted before being sampled at the destination, wherein at least one of the synthesis unit, placement unit, routing unit, and timing analysis unit is implemented in hardware.

23. The system designer of claim 22, wherein the timing analysis unit compares a maximum arrival time of data on the data path at the intermediate node with a minimum arrival time of the corrupting data on the data path at the intermediate node.

24. The system designer of claim 22, wherein one or more of the synthesis unit, the placement unit, and the routing unit makes a modification to a system on the target device in response to the timing analysis unit determining that the data is not being sampled at the destination because of intermediate node corruption.

25. The system designer of claim 22, wherein rise and fall skew occurs when there is a difference in rise time and fall time required for pulling up and pulling down a signal of the components.

* * * * *